United States Patent [19]

Kopp et al.

[11] Patent Number: 4,510,269

[45] Date of Patent: Apr. 9, 1985

[54] PROCESS FOR THE PRODUCTION OF OPTIONALLY CELLULAR POLYURETHANES

[75] Inventors: Richard Kopp, Cologne; Hans-Albrecht Freitag, Bergisch Gladbach, both of Fed. Rep. of Germany

[73] Assignee: Bayer Aktiengesellschaft, Leverkusen, Fed. Rep. of Germany

[21] Appl. No.: 638,160

[22] Filed: Aug. 6, 1984

[30] Foreign Application Priority Data

Aug. 16, 1983 [DE] Fed. Rep. of Germany ....... 3329452

[51] Int. Cl.³ .............................................. C08G 18/14
[52] U.S. Cl. .................................... 521/166; 521/115; 521/167; 528/49
[58] Field of Search ....................... 521/166, 167, 115; 528/53, 49, 73

[56] References Cited

U.S. PATENT DOCUMENTS

4,433,170 2/1984 Zimmerman et al. ................. 528/49

Primary Examiner—Maurice J. Welsh
Attorney, Agent, or Firm—Gene Harsh; Joseph C. Gil; Thomas W. Roy

[57] ABSTRACT

A process for the production of an optionally cellular polyurethane by reacting at least one compound having at least two hydrogen atoms which are reactive with isocyanate groups and have a molecular weight of from about 400 to 10,000 with polyisocyanates in the presence of a poly(dialkylaminoalkyl)ether catalyst corresponding to the formula

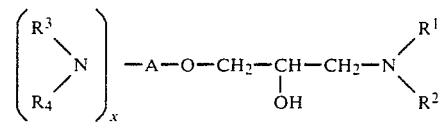

wherein
A represents a straight-chain or branched-chain $(x+1)$-valent, optionally substituted $C_2$-$C_6$ alkyl radical,
x represents an integer of 1 to 4 and
$R^1$-$R^4$ represent the same or different $C_1$-$C_4$ alkyl radicals, which optionally form a heterocyclic radical with N.

10 Claims, No Drawings

PROCESS FOR THE PRODUCTION OF OPTIONALLY CELLULAR POLYURETHANES

BACKGROUND OF THE INVENTION

1. Field of the Invention

The present invention relates to a process for the production of polyurethanes, in particular polyurethane foams, in which hydroxy functional poly(dialkyl-aminoalkyl)-ethers are used as catalysts.

2. Description of the Prior Art

Polyurethanes having the most varied physical properties have for some time now been commercially produced according to the known isocyanate-poly-addition process from compounds having several active hydrogen atoms, in particular from compounds containing hydroxyl, amine and/or carboxyl groups, and from polyisocyanates, optionally by simultaneously using water and/or organic blowing agents, catalysts, emulsifiers and other additives (Angewandte Chemie, 59 (1948) P. 257).

It is possible by an appropriate choice of components to produce homogeneous or cellular products and flexible, elastic foams as well as rigid foams or any variants lying between these extremes.

Polyurethane foams are preferably produced by mixing liquid components, the starting substances which are to be reacted with each other being either simultaneously mixed together or a prepolymer having NCO-groups initially being produced with polyols which is then foamed.

In the production of polyurethane foam, tertiary amines have proved particularly successful as catalysts, in particular because they are capable of accelerating not only the reaction of hydroxyl and/or carboxyl groups and NCO-groups, but also the reaction between water and the isocyanate groups. The reactions which are simultaneously taking place in the one-stage ("one shot") process are coordinated with each other.

Moreover, during the foaming process, additional cross-linking reactions take place with the formation of allophanate, biuret and cyanurate structures. On account of the complexity of the reactions, the synchronous course must be guaranteed by a choice of a suitable catalyst.

Conventionally, tertiary aliphatic amines having a high vapor pressure, such as triethylamine, are used. These amines produce a balanced course of the competing reactions in the core of the foamed parts and in the peripheral region. After foaming, said amines diffuse out of the foams. Thus, the danger of amine-catalyzed decomposition reactions is reduced. Tertiary amines which have a low vapor pressure have, nevertheless, a strong, very unpleasant smell, and thus when they are used it either causes considerable discomfort to the work force in the factories or else extensive ventilation is required.

Therefore, numerous attempts have been made to use amine catalysts which have a relatively low vapor pressure and less of a smell and/or chemically incorporable amine catalysts which simultaneously react in the production of polyurethane.

When incorporable amine catalysts are used, the problem generally arises, that, on the one hand, the basicity and mobility of the catalyst was greatly reduced by incorporating it too rapidly into the polyurethane and, on the other hand, the stability of the completed foam was impaired (hydrolytic and thermal decomposition).

Surprisingly, it has now been found, that certain hydroxy-functional poly(dialkylaminoalkyl) ethers manifest a high activity throughout the course of the polyurethane formation, have a low vapor pressure and thus minimal smell, are chemically bound during the reaction and do not impair the stability of a completed polyurethane part.

SUMMARY OF THE INVENTION

The present invention is directed to a process for the production of an optionally cellular polyurethane by reacting at least one compound having at least two hydrogen atoms which are reactive with isocyanate groups and have a molecular weight of from about 400 to 10,000 with polyisocyanates in the presence of a poly-(dialkylaminoalkyl) ether catalyst corresponding to the formula

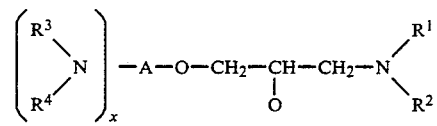

wherein
A represents a straight-chain or branched-chain (x + 1)-valent, optionally substituted $C_2$–$C_6$ alkyl radical,
x represents an integer of 1 to 4 and
$R^1$–$R^4$ represent the same or different $C_1$–$C_4$ alkyl radicals, which optionally form a heterocyclic radical with N.

DETAILED DESCRIPTION OF THE INVENTION

In the subject application polyurethanes are defined as polymers containing urethane groups (groups formed from hydroxyl and isocyanate groups) and, optionally, other groups produced by isocyanate poly-addition reactions.

The radical A, may be substituted by, for example halogen, OH, SH or $NH_2$.

In the general formula, A preferably represents an ethylene radical.

It is moreover preferred, according to the present invention, that compounds corresponding to formulae (I)–(IV), in particular compounds corresponding to formula (I), are used as tertiary amines:

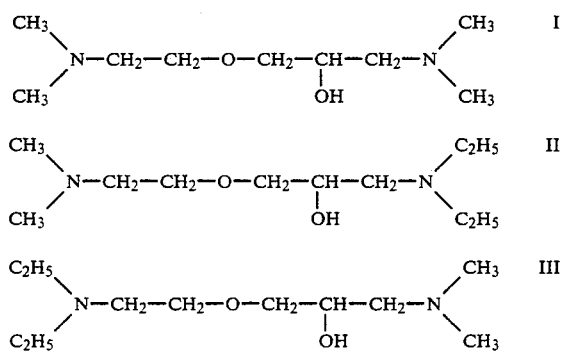

-continued

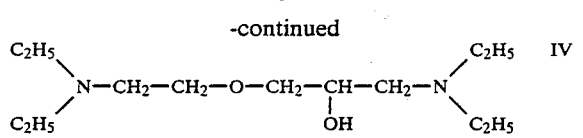

The catalysts to be used according to the present invention may be obtained as follows by the reaction of known secondary amines or dialkylamino alcohols with epihalohydrins:

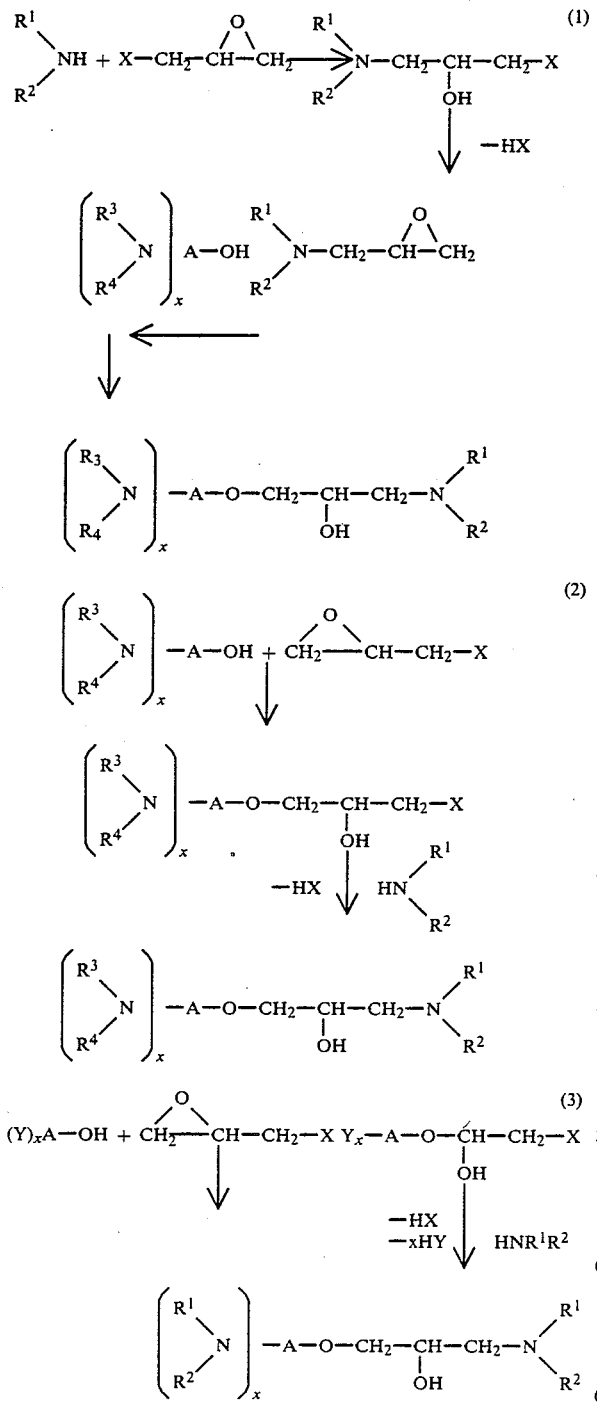

In the above mentioned formulae, the substituents $R^1$-$R^4$, A and x are as defined above. X and Y independently represent a halogen such as fluorine, chlorine and/or bromine. The individual reactions which are described in the methods of production 1-3 are all known.

Method 3 is preferred for the production of the catalysts to be used, according to the present invention, although this method only enables products having the same alkyl amine substituents to be produced.

Halogen polyethers, corresponding to the following formula

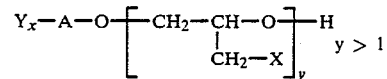

are produced as by-products in this reaction and may easily be separated by distillation from the desired main product ($y=1$) or may be reacted together with said main product in the next step of the reaction, which is preferably carried out in an inert organic solution in an autocalve at a relatively high temperature (from about 80° to 160° C.) in the presence of at least double the molar quantity, based on X+Y, of a secondary amine $HNR^1R^2$. The by-products also produce highly active catalysts which do not have a negative effect on the process according to the present invention.

The implementation of the second stage of the reaction is described in for example Bull. Soc. Chim. Fr. 41, 1046 (1927).

As is known to those skilled in the art, small quantities of by-products result from all reactions with epihalohydrins, in which by-products the ring opening of the epihalohydrin leads to a primary OH-group. Depending on the mode of production, these do not need to be separated and do not impair the process according to the present invention.

Typical examples of compounds to be used according to the present invention are:

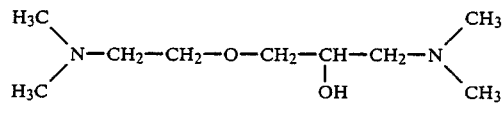

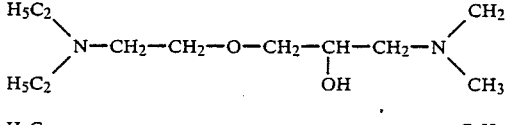

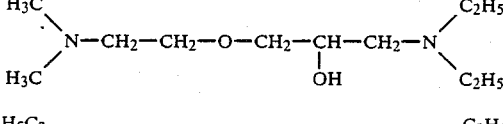

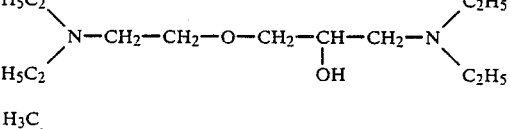

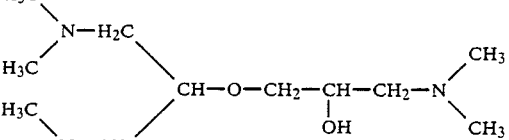

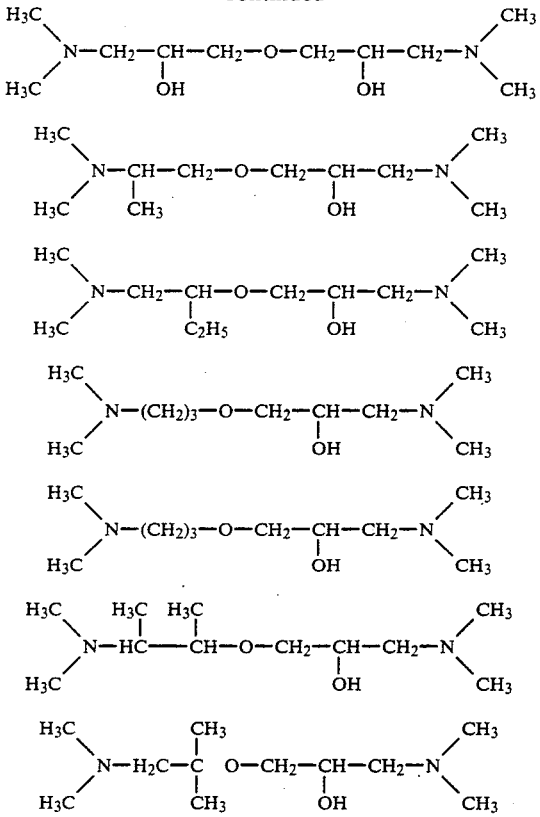

The catalysts according to the invention are generally used in a quantity of from about 0,001 to 10% by weight, preferably of from about 0,1 to 5% by weight, based on the total quantity of compounds having at least two hydrogen atoms which are reactive with isocyanates.

The catalysts to be used, according to the present invention, are distinguished by the following advantages. They may be produced in a high yield from inexpensive starting components and on account of their low vapor pressure they do not have a strong smell. Since they are also incorporated into the polyurethane matrix, the foams which are produced thereby also lack a strong smell. In spite of the incorporation of the amine catalysts, they manifest no increased tendency to decompose.

The catalysts to be used, according to the present invention are surprisingly very active, in spite of their ability to be incorporated. In their catalytic efficiency, they surpass, to a certain extent, standard amine catalysts which cannot be incorporated.

It must be considered as particularly advantageous that the amine catalysts which have been described may be used in every field, and are preferably used in the production of polyurethane flexible foams.

The tendency for an increase in hardness which may be observed may be considered as another advantage, and may be achieved when the catalyst to be used according to the present invention is combined with specific polyol mixtures.

The following starting-materials are used to carry out the process, according to the present invention:

1. Aliphatic, cycloaliphatic, araliphatic, aromatic and heterocyclic polyisocyanates, as are described by W. Siefken in "Justus Liebigs Annalen der Chemie", 562, pages 75 to 136, may be used as starting constituents, such as polyisocyanates corresponding to the formula $$Q(NCO)_n$$

wherein n represents from 2 to 4, preferably 2, and

Q represents an aliphatic hydrocarbon radical having from 2 to 18, preferably from 6 to 10, carbon atoms; a cycloaliphatic hydrocarbon radical having from 4 to 15, preferably from 5 to 10, carbon atoms; an aromatic hydrocarbon radical having from 6 to 15, preferably from 6 to 13, carbon atoms; or an araliphatic hydrocarbon radical having from 8 to 15, preferably from 8 to 13, carbon atoms.

Examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of said isomers, 1-isocyanato-3,3,5-trimethyl-5-isocyanatomethyl-cyclohexane (DE Auslegeschrift No. 1,202,785, U.S. Pat. No. 3,401,190), 2,4- and 2,6-hexahydrotoluylene-diisocyanate and any mixtures of said isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and any mixtures of said isomers, diphenylmethane-2,4'- and/or -4,4'-diisocyanate, naphthylene-1,5-diisocyanate.

The following may also be included according to the present invention: triphenylmethane-4,4',4"-triisocyanate; polyphenyl-polymethylene-polyisocyanates as are obtained by aniline-formaldehyde/condensation and subsequent phosgenation and which are described in GB Pat. Nos. 874,430 and 848,671; m- and p-isocyanatophenyl-sulphonyl-isocyanates according to U.S. Pat. No. 3,454,606; perchlorinated aryl polyisocyanates as are described in the DE-Auslegeschrift No. 1,157,601 (U.S. Pat. No. 3,277,138); polyisocyanates having carbodiimide groups as are described in DE Pat. No. 1,092,007 (U.S. Pat. No. 3,152,162) and also in DE Offenlegungsschriften Nos. 2,504,400, 2,537,685 and 2,552,350; norbornane diisocyanates according to the U.S. Pat. No. 3,492,330; polyisocyanates having allophanate groups as are described in GB Pat. No. 994,890, BE Pat. No. 761,626 and NL Patent Application No. 7,102,524; polyisocyanates having isocyanurate groups as are described in U.S. Pat. No. 3,001,973, in DE Pat. Nos. 1,022,789, 1,222,067 and 1,027,394 and also in DE-Offenlegungsschriften Nos. 1,929,034 and 2,004,048; polyisocyanates having urethane groups as are described in DE Pat. No. 752,251 or in U.S. Pat. Nos. 3,394,164 and 3,644,457; polyisocyanates having acylated urea groups according to DE Pat. No. 1,230,778; polyisocyanates having biuret groups as are described in U.S. Pat. Nos. 3,124,605, and 3,201,373 and also in GB Pat. No. 889,050; polyisocyanates produced by telomerization reactions as are described in U.S. Pat. No. 3,654,106; polyisocyanates having ester groups as are mentioned in GB Pat. Nos. 965,474 and 1,072,956, in U.S. Pat. No. 3,567,763 and in DE Pat. No. 1,231,688; reaction products of the above-mentioned isocyanates with acetylene according to DE Pat. No. 1,072,385; and polyisocyanates containing polymeric fatty acid esters according to U.S. Pat. No. 3,455,885.

It is also possible to use the distillation residues which are produced during the commerical production of isocyanates and have isocyanate groups, optionally dissolved in one or more of the above-mentioned polyisocyanates. It is, moreover, possible to use any mixtures of the above-mentioned polyisocyanates.

Polyisocyanates which are commercially easily accessible are generally particularly preferred for example 2,4- and 2,6-toluylene diisocyanate and any mixtures of said isomers ("TDI"), polyphenyl-polymethylene-polyisocyanates as are produced by aniline-formaldehyde condensation and subsequent phosgenation ("crude MDI") and polyisocyanates having carbodiimide groups, urethane groups, allophanate groups, isocyanurate groups, urea groups or biuret groups ("modified polyisocyanates"), in particular modified polyisocyanates which are derived from 2,4- and/or 2,6-toluylene diisocyanate or from 4,4'- and/or 2,4'-diphenylmethane diisocyanate.

2. Compounds having at least two hydrogen atoms which are reactive with isocyanates and having a molecular weight of from about 400 to 10,000 may be used as starting constituents. This is to be understood as designating compounds which have, in addition to amino groups, thiol groups or carboxyl groups, preferably compounds having hydroxyl groups, in particular compounds having from 2 to 8 hydroxyl groups, and especially those having a molecular weight of from about 1,000 to 8,000 and preferably from about 1,500 to 4,000. Examples include polyesters, polyethers, polythioethers, polyacetals, polycarbonates and polyesteramides having at least 2, generally from 2 to 8 and preferably from 2 to 4 hydroxyl groups which are known for the production of homogeneous and cellular polyurethanes;

(a) The polyesters having hydroxyl groups include reaction products of polyhydric, preferably dihydric and optionally additionally trihydric alcohols with multibasic, preferably dibasic carboxylic acids. Instead of using the free polycarboxylic acids, the corresponding polycarboxylic acid anhydrides or corresponding polycarboxylic acid esters of low alcohols or mixtures thereof may be used for the production of the polyesters. The polycarboxylic acids may be of an aliphatic, cycloaliphatic, aromatic and/or heterocyclic nature and may optionally be substituted, for example, by halogen atoms and/or they may be unsaturated.

The following are examples of such carboxylic acids and derivatives thereof: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimerized and trimerized unsaturated fatty acids, optionally in admixture with monomeric unsaturated fatty acids, such as oleic acid, terephthalic acid dimethylester and terephthalic acid-bis-glycol ester.

The following are included as examples of polyhydric alcohols: ethylene glycol, propylene glycol-(1,2) and -(1,3), butylene glycol-(1,4) and -(2,3), hexane diol-(1,6), octane diol-(1,8), neopentyl glycol, 1,4-bis-hydroxymethylcyclohexane, 2-methyl-1,3-propane diol, glycerine, trimethylolpropane, hexane triol-(1,2,6), butane triol-(1,2,4), trimethylolethane, pentaerythritol, quinitol, mannitol, sorbitol, formitol, methylglycoside, diethylene glycol, triethylene-glycol, tetraethylene glycol and higher polyethylene glycols, dipropylene glycol and higher polypropylene glycols and dibutylene glycol and higher polybutylene glycols. The polyesters may contain carboxyl and groups. Polyesters produced from lactones, e.g. ε-caprolactone, or from hydroxyl carboxylic acids, e.g. ω-hydroxy caproic acid may also be used.

(b) The polyethers having at least 2, generally from 2 to 8, preferably from 2 to 3 hydroxyl groups which are included according to the present invention are known and are produced by the self-polymerization of epoxides, such as ethylene oxide, propylene oxide, butylene oxide, tetrahydrofuran, styrene oxide or epichlorohydrin, e.g. in the presence of Lewis catalysts, such as $BF_3$, or are produced by the addition of these epoxides, preferably ethylene oxide and propylene oxide, optionally in admixture or successively, to starting components having reactive hydrogen atoms such as water, alcohols, ammonia or amines, e.g. ethylene glycol, propylene glycol-(1,3), or -(1,2), trimethylol propane, glycerine, sorbitol, 4,4'-dihydroxydiphenyl propane, aniline, ethanolamine or ethylene diamine. Sucrose polyethers, as are described for example in the DE-Auslegeschriften Nos. 1,176,358 and 1,046,938 and the polyethers which are started on formitol or formose (DE-Offenlegungsschriften 2,639,083 or 2,737,951) are included according to the present invention. In many cases polyethers are preferred which predominantly (up to about 90% by weight, based on all the OH groups present in the polyether) have primary OH groups. Polybutadienes which have OH groups are also suitable according to the present invention.

(c) The condensation products of thiodiglycol with itself and/or with other glycols, dicarboxylic acids, formaldehyde, aminocarboxylic acids or aminoalcohols are included in particular among the polythioethers. Depending on the co-components, the products are polythio mixed ethers, polythioether esters or polythioether ester amides.

(d) Examples of polyacetals are compounds which may be produced from glycols (such as diethylene glycol, triethylene glycol, 4,4'-dioxethoxydiphenyldimethyl methane and hexane diol) and formaldehyde. Polyacetals which are suitable according to the present invention may also be produced by the polymerization of cyclic acetals, such as trioxane (DE-Offenlegungsschrift No. 1,694,128).

(e) Known polycarbonates containing hydroxyl groups are included and may be produced by reacting diols such as propane diol-(1,3), butane diol-(1,4), hexane diol-(1,6), diethylene glycol, triethylene glycol, tetraethylene glycol or thiodiglycol with diaryl carbonates such as diphenyl carbonate or phosgene (DE Pat. Nos. 1,694,080, 1,915,908 and 2,221,751; DE-Offenlegungsschrift No. 2,605,024).

(f) Polyester amides and polyamides include the predominantly linear condensates obtained from multibasic saturated or unsaturated carboxylic acids or the anhydrides thereof and polyhydric saturated or unsaturated amino alcohols, diamines, polyamines and mixtures thereof.

(g) Polyhydroxyl compounds already containing urethane or urea groups, and optionally modified natural polyols, such as castor oil or carbohydrates, e.g. starch, may also be used. Addition products of alkaline oxides to phenol formaldehyde resins or to urea-formaldehyde resins may also be used, according to the present invention.

(h) The above-mentioned polyhydroxyl compounds may be modified in various ways before being used in the polyisocyanate-polyaddition process. Thus, according to DE Offenlegungsschriften Nos. 2,210,839 (U.S. Pat. No. 3,849,515) and 2,544,195, a mixture containing different polyhydroxyl compounds (e.g. a polyether polyol and a polyester polyol) may be condensed by etherification in the presence of a strong acid to produce a polyol of relatively high molecular weight, which is constructed of various segments which are connected via ether bridges. It is also possible, for example, according to DE Offenlegungsschrift No. 2,559,372, to introduce amide groups into the polyhydroxyl compounds or, according to DE Offenlegungsschrift No. 2,620,487, to introduce triazine groups by a reaction with polyfunctional cyanic acid esters. By reacting a polyol with a less than equivalent quantity of a diisocyanato-carbodiimide and then reacting the carbodiimide group with an amine, amide phosphite or a carboxylic acid, polyhydroxyl compounds having guanidine, phosphonoformamidine or acylurea groups are obtained (DE Offenlegungsschriften No. 2,714,289, 2,714,292 and 2,714,293). It is particularly advantageous in some cases to convert the polyhydroxyl compounds of relatively high molecular weight either completely or partly into the corresponding anthranilic acid esters by a reaction with isatoic acid anhydride, as is described in DE Offenlegungsschriften Nos. 2,019,432 and 2,619,840 or in U.S. Pat. Nos. 3,808,250, 3,975,428 and 4,016,143. In this way, compounds having a relatively high molecular weight and aromatic amino end groups are obtained.

By reacting NCO-prepolymers with enamines, aldimines or ketimines containing hydroxyl groups and by subsequent hydrolysis according to DE-Offenlegungsschrift No. 2,546,536 or U.S. Pat. No. 3,865,791, relatively high molecular weight compounds having amino end groups are obtained. Further processes for the production of relatively high molecular weight compounds containing amino end groups or hydrazide groups are described in DE Offenlegungsschrift No. 1,694,152 (U.S. Pat. No. 3,625,871).

(i) Polyhydroxyl compounds which contain high molecular weight polyadducts or polycondensates or polymers in a finely dispersed or dissolved form may optionally also be used according to the present invention. Such polyhydroxyl compounds are obtained if polyaddition reactions (for example reactions between polyisocyanates and amino-functional compounds) or polycondensation reactions (for example between formaldehyde and phenols and/or amines) are allowed to take place in situ in the above-mentioned compounds containing hydroxyl groups. Such processes are described in DE Pat. Nos. 1,168,075 and 1,260,142 and also in the DE Offenlegungsschriften Nos. 2,324,134, 2,423,984, 2,512,385, 2,513,815, 2,550,796, 2,550,797, 2,550,833, 2,550,862, 2,633,293 and 2,639,254. It is however, also possible, according to U.S. Pat. No. 3,869,413 or DE Offenlegungsschrift No. 2,550,860 to mix an aqueous polymer dispersion with a polyhydroxyl compound and subsequently to remove the water from the mixture.

Polyhydroxyl compounds which are modified by vinyl polymers, as are obtained for example by the polymerization of styrene and acrylonitrile in the presence of polyethers (U.S. Pat. Nos. 3,383,351, 3,304,273, 3,523,093, 3,110,695; DE Auslegeschrift No. 1,152,536) or polycarbonate polyols (DE Pat. No. 1,769,795; U.S. Pat. No. 3,637,909) are suitable for the process according to the present invention. By using polyether polyols which were modified according to DE Offenlegungsschriften No. 2,442,101, 2,644,922 and 2,646,141 by graft polymerization with vinyl phosphonic acid esters and optionally (meth)acrylonitrile, (meth)acrylamide or OH-functional (meth)acrylates, plastics are obtained which are particularly flame resistant. Polyhydroxyl compounds into which carboxyl groups are introduced by radical graft polymerization using unsaturated carboxylic acids and optionally further olefinically unsaturated monomers (DE Offenlegungsschriften No. 2,714,291, 2,739,620 and 2,654,746) may be particularly advantageously used in combination with mineral fillers.

By using modified polyhydroxyl compounds of the above-mentioned type as starting components in the polyisocyanate-polyaddition process, polyurethane plastics result in many cases which have substantially improved mechanical properties.

Examples of the above-mentioned compounds to be used according to the present invention are described in, for example, High Polymers, Vol. XVI, "Polyurethanes, Chemistry and Technology", by Saunders-Frisch, Interscience Publishers, New York, London, Volume I, 1962, pages 32 to 42 and pages 44 to 54 and Volume II, 1964 to pages 5 to 6 and 198 to 199, and also in "Kunststoff-Handbuch" Volume VII, Vieweg-Hochtlen, Carl-Hanser-Verlag, Munich, 1966, e.g. on pages 45 to 71. Of course, mixtures of the above-mentioned compounds having at least two hydrogen atoms which are reactive with respect to isocyanates, and having a molecular weight of about 400–10,000, e.g. mixtures of polyethers and polyesters may be used.

It is particularly advantageous in some cases to combine low-melting and high-melting polyhydroxyl compounds with each other (DE Offenlegungsschrift No. 2,706,297).

3. Compounds with at least two hydrogen atoms which are reactive with isocyanates and which have a molecular weight of from about 32 to 400 may optionally be used as starting components. In this instance as well, these are to be understood as designating compounds which have hydroxyl groups and/or amino groups and/or thiol groups and/or carboxyl groups, preferably compounds which have hydroxyl groups and/or amino groups, which act as a chain-lengthening agent or as a cross-linking agent. These compounds generally have from 2 to 8, preferably from 2 to 4 hydrogen atoms which are reactive with isocyanates.

In this instance as well, mixtures of different compounds having at least two hydrogen atoms which are reactive with isocyanates and have a molecular weight of from about 32 to 400 may be used. The following are examples of such compounds: ethylene glycol, propylene glycol-(1,2) and -(1,3), butylene glycol-(1,4), -(1,3) and -(2,3), pentane diol-(1,5), hexane diol-(1,6), octane diol-(1,8), neopentyl glycol, 1,4-bis-hydroxymethyl-cyclohexane, 2-methyl-1,3-propane diol, dibromobutene diol (U.S. Pat. No. 3,723,392), glycerine, trimethylolpropane, hexane triol-(1,2,6), trimethylol ethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxydiphenylpropane, dihydroxymethyl hydroquinone, ethanolamine, diethanolamine, N-methyldiethanolamine, triethanolamine and 3-aminopropanol.

According to the present invention, the mixtures of hydroxyaldehydes and hydroxyketones ("formose") or the multihydric alcohols ("formit") obtained therefrom by reduction are also included as polyols of low molecular weight, such as result from the self-condensation of formaldehyde-hydrate in the presence of metal compounds as a catalyst and compounds which are capable of forming endiols as a co-catalyst (DE Offenlegungsschriften No. 2,639,084, 2,714,084, 2,714,104, 2,721,186, 2,738,154 and 2,738,512). In order to obtain plastics having improved flame resistance, said formoses are advantageously used in combination with aminoplast formers and/or phosphites (DE Offenlegungsschriften No. 2,738,513 and 2,738,532). Moreover, solutions of polyisocyanate-polyaddition products, in particular solutions of polyurethane ureas having ionic groups and/or solutions of polyhydrazodicarbonamides, in multihydric alcohols of low molecular weight are included as polyol components according to the present invention (DE Offenlegungsschrift No. 2,638,759).

The following are examples of suitable aliphatic diamines according to the present invention: ethylene diamine, 1,4-tetramethylene diamine, 1,11-undecamethylene diamine, 1,12-dodecamethylene diamine and mixtures thereof, 1-amino-3,3,5-trimethyl-5-aminomethyl-cyclohexane ("isophorone diamine"), 2,4- and 2,6-hexahydrotoluylene diamine and mixtures thereof, perhydro-,2,4'- and 4,4'-diaminodiphenylmethane, p-xylylene diamine, bis-(3-aminopropyl)-methylamine, diaminoperhydroanthracene (DE Offenlegungsschrift No. 2,638,731) and cycloaliphatic triamines according to DE Offenlegungsschrift No. 2,614,244. Hydrazine and substituted hydrazines, e.g. methylhydrazine, N,N'-dimethylhydrazine and the homologues thereof as well as acid dihydrazides are also included according to the present invention, e.g. carbodihydrazide, oxalic acid hydrazide, the dihydrazides of malonic acid, succinic acid, glutaric acid, adipic acid, β-methyl adipic acid, sebacic acid, hydracrylic acid and terephthalic acid; semi-carbazido-alkylene hydrazides such as β-semi-carbazido-propionic acid hyudrazide (DE Offenlegungsschrift No. 1,770,591), semicarbazido-alkylene carbazine esters, such as 2-semicarbazido-ethyl-carbazine ester (DE Offenlegungsschrift No. 1,918,504) or also amino-semicarbazide compounds such as -aminomethyl semicarbazido-carbonate (DE Offenlegungsschrift No. 1,902,931). To control the reactivity thereof, the amino groups may be completely or partially blocked by aldimine or ketimine groups (U.S. Pat. No. 3,734,894; DE Offenlegungsschrift No. 2,637,115).

Examples of aromatic diamines include bis-anthranilic acid esters according to DE Offenlegungsschriften No. 2,040,644 and 2,160,590; 3,5- and 2,4-diaminobenzoic acid esters according to DE Offenlegungsschrift 2,025,900; the diamines containing ester groups which are described in DE Offenlegungsschriften 1,803,635 (U.S. Pat. Nos. 3,681,290 and 3,736,350), 2,040,650 and 2,160,589; the diamines having ether groups according to DE Offenlegungsschriften No. 1,770,525 and 1,809,172 (U.S. Pat. Nos. 3,654,364 and 3,736,295); 2-halogen-1,3-phenylene diamines which may be substituted in the 5-position (DE Offenlegungsschriften 2,001,772, 2,025,896 and 2,065,893); 3,3'-dichloro-4,4'-diamino-diphenylmethane; toluylene diamine; 4,4'-diamino diphenylmethane; 4,4'-diamino diphenyl disulphides (DE Offenlegungsschrift No. 2,404,976); diamino diphenyl dithioethers (DE Offenlegungsschrift No. 2,509,404); aromatic diamines which are substituted by alkylthio groups (DE Offenlegungsschrift No. 2,638,760); diamino benzene phosphonic acid esters (DE Offenlegungsschrift No. 2,459,491); aromatic diamines containing sulphonate or carboxylate groups (DE Offenlegungsschrift No. 2,720,166); and the high-melting diamines which are listed in DE Offenlegungsschrift No. 2,635,404. Examples of aliphatic aromatic diamines include the amino-alkylthio anilines according to DE Offenlegungsschrift No. 2,734,574.

Compounds such as 1-mercapto-3-aminopropane; optionally substituted amino acids, e.g. glycine, alanine, valine, serine and lysine; and optionally substituted dicarboxylic acids, for example, succinic acid, adipic acid, phthalic acid, 4-hydroxyphthalic acid and 4-aminophthalic acid may also be used according to the present invention as chain-lengthening agents.

Moreover, compounds which are monofunctional with respect to isocyanates may be simultaneously used in proportions of from about 0.10 to 10% by weight, based on polyurethane solids, as so-called chain terminators. Such monofunctional compounds include monoamines such as butyl- and dibutylamine, octylamine, stearylamine, N-methyl-stearylamine, pyrrolidine, piperidine and cyclohexylamine and mono-alcohols such as butanol, 2-ethylhexanol, octanol, dodecanol, the various amyl alcohols, cyclohexanol, and ethylene glycol monoethylethers.

4. The following may optionally be used as auxiliaries and additives.

(a) Water and/or slightly volatile inorganic or organic substances may be used as blowing agents. The following are examples of organic blowing agents: acetone; ethyl acetate; halogen-substituted alkanes such as methylene chloride, chloroform, ethylidene chloride, vinylidene chloride, monofluorotrichloromethane, chlorodifluoromethane or dichlorodifluoromethane; butane; hexane; heptane; diethyl ether; and inorganic blowing agents such as air, $CO_2$ or $N_2O$. A blowing effect may also be achieved by the addition of compounds which decompose at a temperature above room temperature with the release of gases, such as nitrogen. Examples include compounds such as the azo compounds, e.g. azodicarbonamide or azoisobutyric acid nitrile. Further examples of blowing agents in addition to details about the use of blowing agents are described in "Kunststoff Handbuch" Volume VII, published by Vieweg and Hochtlen, Carl-Hanser-Verlag, Munich 1966, e.g. on pages 108 and 109, 453 to 455 and 507 to 510.

(b) Catalysts of a known type may also be used, * e.g. tertiary amines such as triethylamine, tributylamine, N-methyl-morpholine, N-ethyl-morpholine, N,N,N',N'-tetramethyl-ethylene diamine, pentamethyl-diethylene triamine and higher homologues (DE Offenlegungsschriften 2,624,527 and 2,624,528) 1,4-diazobicyclo(2,2,2)-octane, N-methyl-N'-dimethylaminoethyl piperazine, bis-(dimethylaminoalkyl)-piperazines (DE Offenlegungsschrift 2,636,787), N,N-dimethylbenzylamine, N,N-dimethylcyclohexylamine, N,N-diethylbenzylamine, bis-(N,N-diethylaminoethyl)-adipate, N,N,N',N'-tetramethyl-1,3-butanediamine, N,N-dimethyl-β-phenylethylamine, 1,2,-dimethylimidazole, 2-methylimidazole, monocyclic and bicyclic amidines (DE Offenlegungsschrift No. 1,720,633), bis-(dialkylamino)-alkyl ether (U.S. Pat. No. 3,330,782, DE Pat. No. 1,030,558, DE Offenlegungsschriften Nos. 1,804,361 and 2,618,280) as well as tertiary amines containing amide groups (preferably formamide groups) according to DE Offenlegungsschriften Nos. 2,523,633 and 2,732,292). The following known Mannich bases containing secondary amines may be included as catalysts: reaction products of dimethylamine and either aldehydes (preferably formaldehyde) or ketones (such as actone, methylethyl ketone or cyclohexanone) and in addition phenols (such as phenol, nonylphenol or bisphenol).

\* in combination with the inventive catalysts

The following are examples of tertiary amines having hydrogen atoms which are active with respect to isocyanate groups, which may be used as catalysts: triethanolamine, triisopropanolamine, N-methyl-diethanolamine, N-ethyl-diethanolamine, N,N-dimethylethanolamine, the reaction products thereof with alkylene oxides such as propylene oxide and/or ethylene oxide and secondary-tertiary amines according to DE Offenlegungsschrift No. 2,732,292.

Moreover, silaamines having carbon-silicon bonds, as are described in DE Pat. No. 1,229,290 (corresponding to U.S. Pat. No. 3,260,984) are included as catalysts: e.g. 2,2,4-trimethyl-2-silamorpholine and 1,3-diethylaminomethyl-tetramethyl-disiloxane.

Nitrogen-containing bases such as tetraalkylammonium hydroxides, alkali hydroxides such as sodium hydroxide, alkali phenolates such as sodium phenolate or alkali alcoholates such as sodium methylates are also included as catalysts. Hexahydrotriazines may also be used as catalysts (DE Offenlegungsschrift No. 1,769,043).

The reaction of NCO-groups and Zerewitinoff-active hydrogen atoms is also accelerated by lactams and azalactams, whereby first of all an association forms between the lactam and the compound having acid hydrogen. Such assocations and their catalytic effect are described in DE offenlegungschriften Nos. 2,062,288, 2,062,289, 2,117,576 (U.S. Pat. No. 3,758,444), 2,129,198, 2,330,174 and 2,330,211.

Organic metal compounds, in particular organic tin compounds, may also be used as catalysts according to the present invention. In addition to sulphur-containing compounds such as di-n-octyl-tin-mercaptide (DE-A No. 1,769,367; U.S. Pat. No. 3,645,927), tin(II)-salts of carboxylic acids such as tin(II)-acetate, tin(II)-octoate, tin(II)-ethyl hexoxate and tin(II)-laurate and the tin-(IV)-compounds such as dibutyl tin oxide, dibutyl tin dichloride, dibutyl tin diacetate, dibutyl tin dilaurate, dibutyl tin maleate or dioctyl tin diacetate are preferably considered as organic tin compounds.

Of course, all the above-mentioned catalysts may be used as mixtures. Combinations of organic metal compounds and amidines, amino-pyridines or hydrazino pyridines are of particular interest (DE Offenlegungsshriften Nos. 2,434,185, 2,601,082 and 2,603,834).

Further examples of catalysts to be used according to the present invention in addition to details about the mode of operation of the catalysts are described in "Kunststoff-Handbuch", Volume VII, published by Vieweg and Hochtlen, Carl-Hanser-Verlag, Munich, 1966, e.g. on pages 96 to 102.

The catalysts are generally used in a quantity of from about 0.001 to 10%, by weight, based on the total quantity of compounds having at least two hydrogen atoms which are reactive with isocyanates.

(c) Surface-active additives such as emulsifiers and foam stabilizers may also be included. The sodium salts of castor oil-sulphonates or salts of fatty acids with amines such as the oleate of diethyl amine or the stearate of diethanol amine are examples of emulsifiers. Alkali or ammonium salts of sulphonic acids such as dodecylbenzene sulphonic acid or dinaphthylmethane disulphonic acid or of fatty acids such as ricinoleic acid or of polymeric fatty acids may simultaneously be used as surface-active additives.

Polyether siloxanes, in particular water-soluble polyether siloxanes, are particularly suitable as foam stabilizers. These compounds are generally synthesized such that a copolymer of ethylene oxide and propylene oxide is linked to a polydimethyl siloxane radical. Such foam stabilizers are described in U.S. Pat. Nos. 2,847,748, 2,917,480 and 3,629,308. Polysiloxane-polyalkylene copolymers which are often branched via allophanate groups according to DE Offenlegungsschrift No. 2,558,523 are of particular interest.

(d) Examples of additional additives include reaction retarders such as acid-reacting substances like hydrochloric acid or organic acid halides; known cell regulators such as paraffins, fatty alcohols or dimethylpolysiloxanes; pigments or dyes, known flame-proofing agents such as tris-chloroethyl phosphate or ammonium polyphosphate; stabilizers against the influence of age and weathering; plasticizers; fungistatically and bacteriostatically active substances; and fillers such as barium sulphate, kieselguhr, carbon black or washed chalk.

Further examples of surface-active additives and foam stabilizers which may be simultaneously used according to the present invention as well as cell regulators, reaction retarders, stabilizers, flame-inhibiting substances, plasticizers, dyes, and fillers as well as fungistatically and bacteriostatically active substances and details about the mode of use and mode of operation of said additives are described in "Kunststoff-Handbuch", Volume VII, published by Vieweg and Hochtlen, Carl-Hanser-Verlag, Munich 1966, e.g. on pages 103 to 113.

The present process is carried out as follows:

The reaction constituents are reacted according to the known one-stage process, the prepolymer process or the semi-prepolymer process, and this often needs mechanical apparatus, e.g. as are described in U.S. Pat. No. 2,764,565. Details of the processing apparatus, which are also included, according to the present invention, are described in "Kunststoff-Handbuch", Volume VII, pubished by Vieweg and Hochtlen, Carl-Hanser-Verlag, Munich 1966, e.g. on pages 121 to 205.

During the production of foam, foaming may also be carried out in closed molds. Thus, the reaction mixture is introduced into a mold. A metal, e.g. aluminum, or a plastic, e.g. epoxy resin, may be used as the material of the mold. The reaction mixture which is capable of foaming foams up in the mold and forms a molding. The mold foaming may be carried out so that the molding has a cell structure on its surface, but may also be carried out so that the molding has a compact surface and a cellular core. In this context, according to the present invention, it is possible to proceed such that the quantity of foamable reaction mixture which is introduced into the mold is such that the foam which is produced just fills the mold. It is also possible to introduce more reaction mixture into the mold than is necessary to fill the inside of the mold with foam. The latter method is thus carried out by "over charging"; such a mode of operation is known for example from U.S. Pat. Nos. 3,178,490 and 3,182,104.

During the mold forming, known "external mold release agents" such as silicon oils may often be simultaneously used. So-called "internal mold release agents" optionally in admixture with external mold release agents may also be used, as are known from DE Offenlegungsschriften Nos. 2,121,670 and 2,307,589.

Foams which become rigid when cold may also be produced according to the present invention (c.f. GB Pat. No. 1,162,517, DE Offenlegungsschrift No. 2,531,086).

Of course, foams may also be produced by blocked foaming or according to the known laminator process.

The products which are obtained according to the present invention may be used in the following applications:

as cushioning materials, mattresses, insulating materials, coatings, rubber-elastic materials, plastics and lacquers.

The invention is further illustrated but is not intended to be limited by the following examples in which all parts and percentages are by weight unless otherwise specified.

EXAMPLES (A) Production of the amine catalysts according to method 1

(1) Production of glycidyl diethylamine 57.6 g (2.16 mols) of diethylamine were added dropwise to a mixture consisting of 200 g (2.16 mols) of epichlorohydrin and 3 g of water at room temperature with stirring over a period of 1 hour. The temperature of the reaction mixture was maintained below 30° C. by a water bath. After the addition, the mixture was stirred for about 6 hours at this temperature and the reaction mixture was subsequently left to stand overnight.

Then a mixture containing 120 g (3 mols) of sodium hydroxide and 330 g of water were added and the reaction mixture was subsequently stirred at a temperature below 30° C. Thereafter, 100 ml of 50% aqueous potassium hydroxide solution were added, after which, a phase separation occurred. The upper layer was separated, dried with zeolite beads, filtered and after the addition of a potassium hydroxide pellet, was distilled by fractionation.

Boiling point 45°–45° C./9 mm Hg.
Refractive index: $n_D^{20} = 1.4320$.
Yield 46.8 g (16.8% of the theoretical yield).

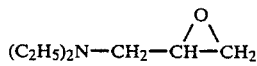

(2) The reaction of glycidyl diethylamine with 2(di-methylamino)ethanol 25.8 g (0.2 mols) of glycidyl diethylamine were added dropwise over a period of 20 minutes to a mixture containing 17.8 g (0.2 mols) of 2-(dimethylamino)-ethanol and 0.5 g of 50% aqueous potassium hydroxide at 80° C. The reaction mixture was maintained at 80° C. by a water bath. The mixture was subsequently stirred for 1 hour at 80° C. and then fractional distillation was carried out.

Boiling point: 80°–85° C./0.28 mm Hg.
Refractive index: $n_D^{20} = 1.4530$.

Yield: 6.1 g (14% of the theoretical yield).

(B) The production of amine catalysts according to method 3

(3) Production of 1-chloro-3-(2-chloroethoxy)-propanol-2

2,674 g (28.91 mols) of epichlorohydrin were added dropwise to a mixture containing 6,982 g (86.73 mols) of 2-chloroethanol and 29 ml of boro trifluoride-etherate solution over a period of about 3 hours at 60° C. The mixture was stirred for 2 hours at 60° C. and left to stand overnight. 4,350 g of chloroethanol were distilled off (130° C./760 mm Hg) and the remaining reaction mixture was neutralized, filtered and distilled.

Boiling point: 117°–124° C./15 mm.
Yield: 3895 g (77.9% of the theoretical yield based on epichlorohydrin).

(4) The production of 1-chloro-3-[bis(chloromethyl)-methoxy]-propanol-2

95.58 g. (1.03 mols) of epichlorohydrin were added dropwise to a mixture containing 500 g (3.88 mols) of glycerine dichlorohydrin and 0.39 ml of boron trifluoride ethanerate solution over a period of from 5 to 6 h at 50° C. The mixture was stirred for 5 hours at 50° C. and distilled by fractionation.

Boiling point: 125–130° C. / 0.6 mm.
Yield: 97.79 g (42.9% of the theoretical yield).

(5) The production of 1-dimethylamino-3-[bis(dimethylaminomethyl)-methoxy]-propane-2

90 g of 1-chloro-3[bis(chloromethyl)methoxy]-propanol-2 and 1,200 ml of toluene and 146.3 g of dimethylamine were heated to 120° C. for 8 hours in an autoclave. The suspension which was obtained was filtered, the filtration residue was subsequently washed with about 200 ml of toluene and the combined liquid organic phases were distilled by fractionation.

Boiling point: 100–107° C. / 0.15 mm
Yield: 40.3 g (40.2% of the theoretical yield)
The mass spectrum corresponded to the given structure.
Titration with 1 N HCl: 11.8 ml/g (theoretically 12.14 ml/g).

Production of 1-dimethylamino-3-(2-dimethylaminoethoxy)-propanol-2

136 g of 1-chloro-3-(2-chloroethoxy)-propanal-2, 630 ml of toluene and 325 ml of liquid dimethylamine were heated to 100° C. over a period 10 hours in a 1.3 liter autoclave. The suspension which was obtained was filtered, the filtration residue was subsequently washed with about 100 ml of toluene and the combined organic phase were distilled by fractionation.

Boiling point: 105°–108° C./1.2 mm.
Yield: 105.9 g (70.9% of the theoretical yield).
Refractive index: $n_D^{20} = 1.4501$.
Mass spectrum and H-NMR-spectrum correspond to the given structure.
Titration with 1 N HCl: 10.3 ml/g (theoretically 10.52 ml/g).

By using this catalyst, according to the present invention, molded foams were produced according to known processes and the mechanical properties of the foams were determined. Moreover, by substituting known catalysts for the catalyst according to the present invention, reaction times of polyurethane reaction mixtures were measured and thus a comparison was made between the activity of these catalysts.

the conventionally widely used catalysts dimethlethanolamine, triethylamine and catalyst[6]). As a substitute for catalyst [5]), approximately double the quantity of the catalyst, according to the present invention, was

TABLE 1

| Formulation | Formulation constituent | | | | | | | |
|---|---|---|---|---|---|---|---|---|
| | I | II | III | IV | V | VI | VII | VII |
| | (Parts by weight) | | | | | | | |
| trifunctional polyether[1] OH No. 28 | 100 | 100 | — | — | — | — | — | — |
| trifunctional polyether[2] OH No. 28 | — | — | 100 | 100 | — | — | — | — |
| hexafunctional polyether[3] OH No. 28 | — | — | — | — | 100 | 100 | 100 | 100 |
| water | 3.1 | 3.1 | 2.6 | 2.6 | 3.0 | 3.0 | 3.1 | 3.1 |
| Catalyst[4] | 0.1 | 0.1 | 0.1 | 0.1 | 0.15 | 0.15 | 0.1 | 0.1 |
| Catalyst[5] | 0.4 | 0.4 | 0.1 | 0.1 | 0.3 | — | 0.2 | 0.2 |
| Catalyst[6] | 0.5 | — | — | — | — | — | — | — |
| Catalyst triethylamine | — | — | — | — | — | — | 0.2 | — |
| Catalyst dimethyletanolamine | — | — | 0.6 | — | 0.4 | 0.4 | — | — |
| Cross-linker 56[7] | — | — | 0.6 | 0.6 | — | — | — | — |
| Dibutyltindilaurate | 0.1 | 0.1 | — | — | — | — | — | — |
| 1-Dimethylamino-3-(2-dimethyl-aminoethoxy)-propanol-2 | — | 0.5 | — | 0.5 | — | 0.6 | — | 0.3 |
| Stabilizer KS 43[8] | 1.0 | 1.0 | 0.75 | 0.75 | 1.0 | 1.0 | 0.75 | 0.75 |
| 80% TDI 80[10] + 20% crude MDI[11] | — | — | 32.3 | 32.3 | — | — | — | — |
| 70% TDI 65[12] + 30% crude MDI | 37.8 | 37.8 | — | — | — | — | 38.3 | 38.3 |
| TDI 80 | — | — | — | — | 33.4 | 33.4 | — | — |
| Index | 100 | 100 | 100 | 100 | 100 | 100 | 100 | 100 |
| Rest time, s | 5 | 5 | 4 | 4 | 5 | 4 | 5 | 5 |
| Setting time, s | 51 | 43 | 51 | 52 | 46 | 44 | 62 | 59 |
| Rising time, s | 80 | 69 | 83 | 85 | 69 | 69 | 94 | 90 |
| Smell of foam | slight | slight | slight | slight | slight | slight | strong | slight |

Table 1 shows that the catalysts according to the present invention had a somewhat higher activity than required. The small of the foam was considerably reduced by using this catalyst instead of triethylamine.

TABLE 2

| Formulation | Formulation constituents | | | | | | | |
|---|---|---|---|---|---|---|---|---|
| | IX | X | XI | XII | XIII | XIV | XV | XVI |
| | (parts by weight) | | | | | | | |
| trifunctional Polyether[1] OH No. 28 | — | — | 100 | 100 | 100 | 100 | — | — |
| trifunctional polyether[2] OH No. 28 | 100 | 100 | — | — | — | — | — | — |
| hexafunctional Polyether[3] OH No. 28 | — | — | — | — | — | — | 70 | 70 |
| trifunctional Polyether[9] OH No. 28 | — | — | — | — | — | — | 30 | 30 |
| Water | 2.6 | 2.6 | 3.1 | 3.1 | 3.1 | 3.1 | 3.1 | 3.1 |
| Catalyst[4] | 0.1 | 0.1 | — | 0.1 | 0.1 | 0.1 | 0.15 | 0.15 |
| Catalyst[5] | 0.1 | 0.1 | 0.4 | 0.4 | 0.4 | 0.4 | 0.25 | 0.25 |
| Catalyst Dimethylethanolamine | 0.6 | — | — | — | — | — | — | — |
| Catalyst[6] | 0.3 | 0.3 | 0.5 | 0.5 | — | 0.5 | — | — |
| Catalyst triethylamine | — | — | — | — | — | — | 0.2 | — |
| Cross-linker 56[7] | 0.6 | 0.6 | — | — | — | — | — | — |
| 1-Dimethylamino-3-(2-dimethylamino-ethoxy)-propanol-2 | — | 0.5 | — | 0.5 | 0.5 | 0.5 | — | 0.2 |
| | — | 0.5 | — | 0.5 | 0.5 | 0.5 | — | 0.2 |
| Stabilizer-KS 43[8] | 0.75 | 0.75 | 1.0 | 1.0 | 1.0 | 1.0 | 0.75 | 0.75 |
| 80% TDI 80 + 20% crude MDI | 32.8 | 32.8 | 37.8 | 37.8 | 37.8 | 37.8 | — | — |
| 70% TDI 65 + 30% crude MDI | — | — | — | — | — | — | 36.8 | 36.8 |
| Index | 100 | 100 | 100 | 100 | 100 | 100 | 100 | 100 |
| Molding weight(g) | 965 | 962 | 850 | 838 | 831 | 850 | 860 | 850 |
| Indentation hardness DIN 53576, Method B, $\epsilon \times 40\%$; after 1h (N) | — | — | — | — | — | — | 195 | 209 |
| Indentation hardness DIN 53576, Method B, $\epsilon \times 40\%$; after 72h (N) | 100 | 102 | 125 | 110 | 110 | 118 | 200 | 207 |
| Apparent density, DIN 52420 (kg/cm$^3$) | 43 | 43 | 36 | 37 | 35.5 | 36 | 36 | 35.5 |
| Compression hardness, DIN 52377, $\epsilon \times 40\%$ (kPa) | 1.7 | 1.8 | 1.9 | 1.8 | 1.7 | 1.9 | 3.1 | 3.1 |
| Tensile strength, DIN 53571 (kPa) | 75 | 70 | 75 | 90 | 90 | 90 | 100 | 90 |
| Breaking elongation, DIN 53571 (%) | 165 | 150 | 150 | 170 | 175 | 175 | 120 | 120 |
| Pressure deformation residue DIN 53572, $\epsilon \times 75\%$, 70° C., 24h | 7.7 | 6.6 | 7.9 | 8.2 | 7.6 | 8.2 | 9.1 | 9.8 |
| Compression hardness, ASTM-D-1564-71, $\epsilon \times 50\%$ | | | | | | | | |
| Before aging in a steam autoclave (kPa) | 2.0 | 2.2 | 2.3 | 2.1 | 2.0 | 2.3 | 3.5 | 3.6 |

TABLE 2-continued

| | Formulation constituents | | | | | | |
|---|---|---|---|---|---|---|---|
| Formulation | IX | X | XI | XII | XIII | XIV | XV | XVI |
| | | | | (parts by weight) | | | | |
| After aging in a steam autoclave (kPa) | −25 | −30 | −13 | ±0 | −5 | −4 | −9 | −6 |
| Pressure deformation residue, ASTM 1564, ε × 50% | | | | | | | | |
| Before aging in a steam autoclave (%) | 12 | 11 | 9.5 | 12 | 12 | 12 | 9.1 | 9.8 |
| After aging in a steam autoclave (%) | 19 | 15 | 18 | 18 | 18 | 19 | 16 | 17 |

[1] Polyether: Trimethylolpropane + 87% PO + 13% EO.
[2] Polyether: Trimethylolpropane + 83% PO + 17% EO.
[3] Polyether: Sorbitol + 83% PO + 17% EO.
[4] Bisdimethylaminoethylether
[5] Triethylenediamine, 33% in dipropylene glycol
[6] Bisdimethylaminopropylformamide
[7] x)(Commercial product of Bayer AG)
[8] Silicone-foam stabilizer, commercial product of Bayer AG
[9] Produced according to Example 3a of DE-OS 2,519,004
[10] Mixture of 80% 2,4- and 20% 2,6-toluylene diisocyanate
[11] NCO content - 31%, viscosity (200 cps, 23° C.) -
[12] Mixture of 65% 2,4- and 35% 2,6-toluylene diisocyanate.
(x)Polyalkylene polyamine mixture, NH-number 1065

The Examples in Table 2 show that, within the range of the results of the experiments, the mechanical properties of the foam produced with the catalyst of the present invention, even after ageing in a steam autoclave, are generally at least as good as the mechanical properties of the foams based on conventional catalysts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular polyurethane by reacting at least one compound having at least two hydrogen atoms which are reactive with isocyanate groups and have a molecular weight of from about 400 to 10,000 with polyisocyanates in the presence of a poly-(dialkylaminolakyl) ether catalyst corresponding to the formula

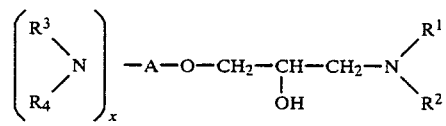

wherein
A represents a straight-chain or branched-chain (x+1)-valent, optionally substituted $C_2$-$C_6$ alkyl radical,
x represents an integer of 1 to 4 and
$R^1$-$R^4$ represent the same or different $C_1$-$C_4$ alkyl radicals, which optionally form a heterocyclic radical with N.

2. The process of claim 1 wherein A represents ethylene radical.

3. The process of claim 1 wherein $R^1$ and $R^4$ represent either methyl or ethyl radicals.

4. The process of claim 2 wherein $R^1$ and $R^4$ represent either methyl or ethyl radicals.

5. The process of claim 1 wherein a chain lengthening agent having at least two hydrogen atoms which are reactive with isocyanate groups and having a molecular weight of from about 32 to 400 is present.

6. The process of claim 1 wherein said polyurethane is a cellular polurethane and water and/or an organic blowing agent is present.

7. The process of claim 1 wherein said catalyst corresponds to the formula

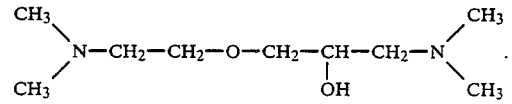

8. The process of claim 1 wherein said catalyst corresponds to the formula

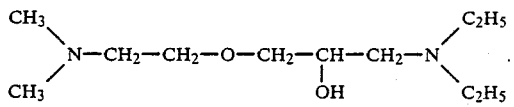

9. The process of claim 1 wherein said catalyst corresponds to the formula

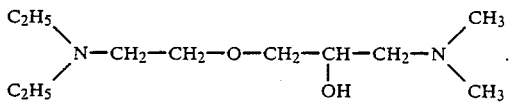

10. The process of claim 1 wherein said catalyst corresponds to the formula

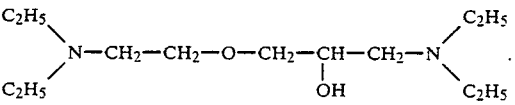

* * * * *